United States Patent [19]
Bingham

[11] Patent Number: 4,700,286
[45] Date of Patent: Oct. 13, 1987

[54] INTEGRATED HALF-WAVE RECTIFIER CIRCUIT

[75] Inventor: David Bingham, San Jose, Calif.

[73] Assignee: Maxim Integrated Products, Inc., Sunnyvale, Calif.

[21] Appl. No.: 924,933

[22] Filed: Oct. 16, 1986

Related U.S. Application Data

[63] Continuation of Ser. No. 696,281, Jan. 30, 1985, abandoned.

[51] Int. Cl.$^4$ ............................................ H02M 7/217
[52] U.S. Cl. ...................................... 363/127; 363/147
[58] Field of Search ....................... 323/224, 223, 266; 363/89, 126, 127, 128, 147

[56] References Cited

U.S. PATENT DOCUMENTS

| | | | |
|---|---|---|---|
| 3,866,063 | 2/1975 | Long | 363/127 |
| 4,172,279 | 10/1979 | Stein | 363/147 |
| 4,276,592 | 6/1981 | Goldman et al. | 363/127 |
| 4,347,561 | 8/1982 | McLellan | 363/127 |

Primary Examiner—Patrick R. Salce
Assistant Examiner—Jeffrey Sterrett
Attorney, Agent, or Firm—Lyon & Lyon

[57] ABSTRACT

An integrated off-line half-wave rectifier commonly connected to one side of the AC line at one of its output terminals is disclosed. An equivalent diode device passes current to the output during a positive AC input half cycle. A comparator senses the negative half cycle and turns on a switching device to conduct current between the two AC input terminals during that cycle.

6 Claims, 4 Drawing Figures

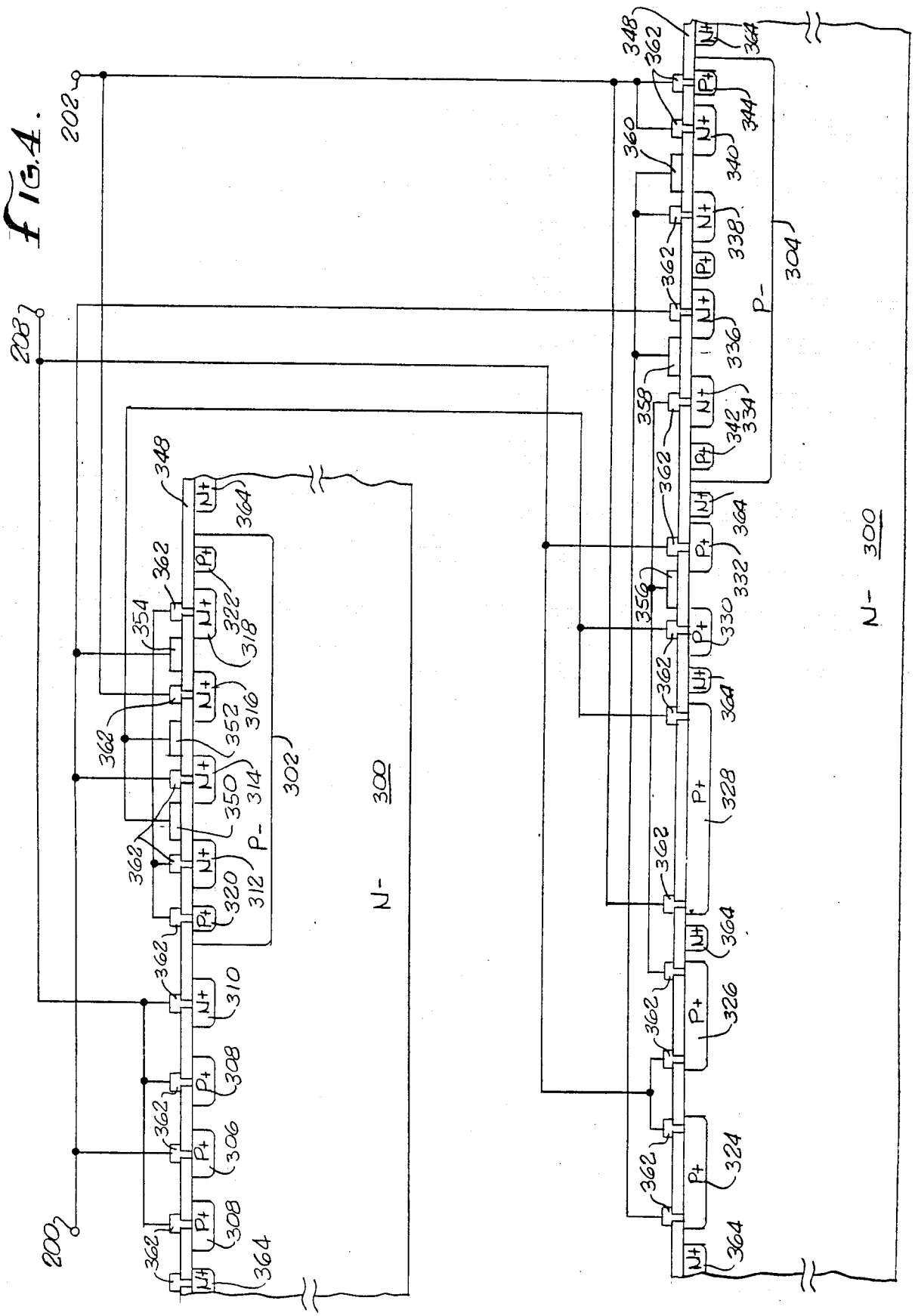

4,700,286

INTEGRATED HALF-WAVE RECTIFIER CIRCUIT

This is a continuation of application Ser. No. 696,281 filed Jan. 30, 1985 now abandoned.

BACKGROUND OF THE INVENTION

1. Field of the Invention

The present invention relates to integrated semiconductor devices and power supplies for such devices. More particularly, the present invention relates to a half-wave rectifier circuit which may be integrated on the same piece of semiconductor material as the circuitry which it drives and which uses a minimum number of discrete components.

2. The Prior Art

Discrete components half-wave rectifier circuits are well known and are in wide use to power all types of DC circuitry. Recently, packaged power supplies have come into use. Such power supplies reduce the cost of an electronic system in which they are utilized, and often save space, further making packaged systems more economical to produce. Some of these power supplies utilize pre-packaged rectifier subassemblies which contribute to the above-recited economies.

Because of their nature, certain electronic circuits, i.e., those incorporating triacs and SCRs used to control AC power in products such as microwave ovens and other appliances, heater circuits and lighting control circuits, require a circuit connection which is common to one side of the AC power line, usually the neutral side. The total power consumed by such circuits, including triac drives, is usually on the order of less than one watt. DC power for such circuits may be supplied by either a transformer-coupled full wave rectifier or a singe diode half-wave rectifier.

The recent miniaturization revolution has been brought about by introduction of the integrated circuit, which incorporates a plurality of semiconductor devices on the same piece of semiconductor substrate material. Integrated circuit elements have found their way into use in many products; refrigerators, washing machines, microwave ovens and television sets are but a few of the many products which incorporate microprocessors to enhance their functionality. Many, if not most, of these products take power from the AC power supplied to homes and businesses. At power levels in the neighborhood of one watt or less, it becomes economically advantageous to integrate a rectifier or complete power supply onto the same semiconductor substrate as the circuitry it drives.

The provision of integrated components and subassemblies make these products easier and more economical to produce. However, the integration of more than one diode in the configuration necessary to produce a current-driven half-wave rectifier has presented several technical problems due to the nature of both the diode circuit and the nature and architecture of the semiconductor medium onto which more than one of such diodes must be integrated.

SUMMARY OF THE INVENTION

According to the present invention, there is provided a current-driven half-wave rectifier circuit which may be integrated on the same semiconductor substrate material as all or some of the semiconductor circuitry to which it supplies power.

A PNP junction device is configured as a series blocking diode between one of two circuit input terminals and an output terminal. A switching device is connected between the two input terminals of the circuit, configured to turn on during the AC half-cycle when the PNP junction device is not conducting. The control portion of the switching device is connected so as to sense the relative polarity of the circuit's two input terminals.

One of the two input terminals serves also as one of the output terminals of the circuit in order to provide a reference to the AC line input. This is useful for providing control of devices which require such a reference to the AC line, including triacs and other thyristors. The other output terminal of the circuit is at the end of the PNP junction device away from the connection to the input terminal.

According to a preferred embodiment of the present invention, the PNP junction device is a PNP transistor having its base connected to its collector and the switching device, as well as the means to control it, are MOS devices.

OBJECTS AND ADVANTAGES

It is an object of the present invention to provide a current-driven half-wave rectifier circuit which may be integrated on a single piece of semiconductor substrate material with circuitry it powers.

It is another object of the present invention to provide an integrated half-wave rectifier circuit which has one of its output terminals common with one of its input terminals.

It is a further object of the present invention to provide an integrated half-wave rectifier circuit which reduces the cost of producing electronic products.

It is yet another object of the present invention to provide an integrated half-wave rectifier circuit which overcomes some of the problems in the prior art.

The present invention provides the advantage of incorporation of the rectifier circuit onto the same semiconductor substrate as the circuitry which it drives. It allows the fabrication of control circuitry for devices such as "smart" household appliances as well as other devices, which circuitry may be integrated and packaged so that it may be connected directly to the AC line using a small number of inexpensive discrete devices such as resistors and capacitors.

Still other objects and advantages of the present invention will become apparent to those of ordinary skill in the art from a reading of the following description of the preferred embodiments in conjunction with the attached drawings and appended claims.

BRIEF DESCRIPTION OF THE DRAWINGS

FIGS. 4A and 4B together comprise a representative semiconductor profile drawing of a preferred embodiment of the present invention utilizing CMOS devices and processing.

DESCRIPTION OF THE PREFERRED EMBODIMENTS

Figure 1:
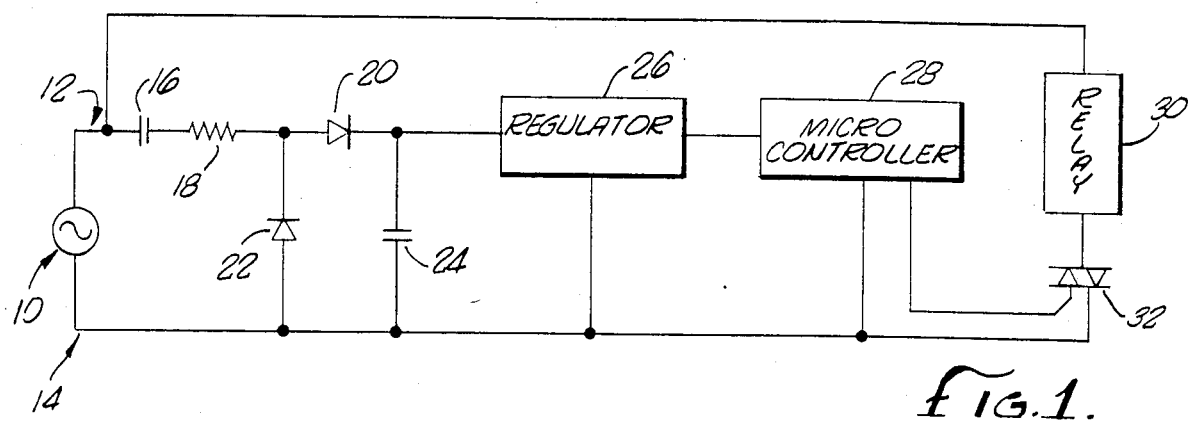
FIG. 1 is a schematic/block diagram of a typical environment in which the present invention functions, including an oversimplified representation of the present invention.

Referring now to the drawings, and more particularly to FIG. 1, a typical application environment for the present invention is depicted. AC voltage source 10 is supplied to lines 12 and 14, the latter of which is common to both an input terminal and an output terminal of the circuit. Capacitor 16 and resistor 18 are in series with line 12. Rectifier diode equivalent 20 is placed in series with resistor 18, its anode closest to to resistor 18. Diode equivalent 22 is placed between line 14 and the junction of resistor 18 and rectifier diode equivalent 16, and has its anode end connected to line 14. Diode equivalent 22 functions to discharge capacitor 16 during the AC half-cycle where line 14 is positive with respect to line 12.

Half-wave rectified DC current appears at the cathode end of rectifier diode equivalent 20. Filter capacitor 24 is placed between line 14 and the cathode of rectifier diode equivalent 22 to provide a low reactance to the ripple frequency and smooth the DC voltage at the output of the half-wave rectifier.

The output of the half-wave rectifier is fed to voltage regulator 26, whose output is fed to the circuitry to be driven, in this case microcontroller 28. Microcontroller 28 may be used to control, for example, relay 30 via triac 32.

One principal advantage of the present invention is that the entire circuit of FIG. 1, with the exception of capacitors 16 and 24, resistor 18, relay 30 and triac 32, may be integrated on a single piece of semiconductor substrate material.

As is observable from an examination of FIG. 1, diode equivalent 22 is necessary because of the presence of capacitor 16, which must be discharged during each negative half-cycle of AC power source 10 if it is to conduct again during the next positive half-cycle. Resistor 18 is a current limiting device which protects the semiconductor devices in the circuit from the effects of voltage surges.

In the following discussion with respect to the remaining drawing figures herein, reference will be made to various MOS (metallic oxide semiconductor) transistor devices. In naming the terminals of these devices, certain conventions will be employed herein. Source and drain terminals of these devices are interchangeable and will be named according to the following convention. With respect to N-Channel devices, the most positive of the channel connections at any given time will be called the drain; the most negative of these terminals will be called the source. With respect to P-Channel devices, the opposite will be true.

The N-Channel MOS transistors disclosed herein are enhancement types which will turn on when gate to source voltage is positive and greater than zero. The P-Channel MOS transistors disclosed herein are enhancement type, which will turn on when gate to source voltage is negative and less than zero.

Figure 2:
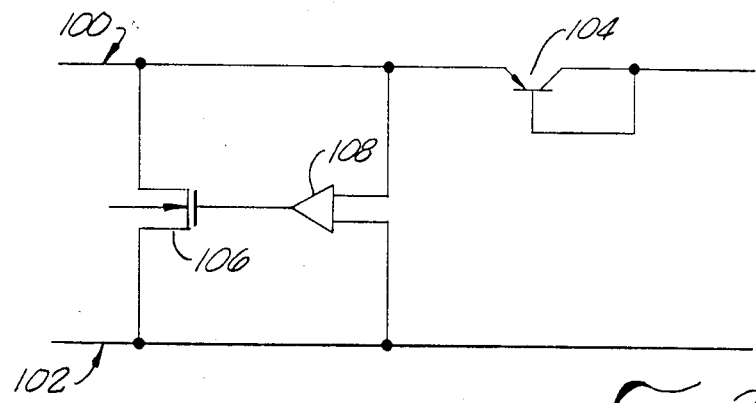
FIG. 2 is a schematic diagram of the basic implementation of a preferred embodiment of the present invention.

Referring now to FIG. 2, a basic implementation of a preferred embodiment of the present invention is depicted. The circuit of FIG. 2 replaces both rectifier diode equivalent 20 and diode equivalent 22 of FIG. 1.

Input line 100 (the equivalent of the anode end of rectifier diode equivalent 22 of FIG. 1) and input line 102 (the equivalent of input line 14 of FIG. 1) supply AC current to the half-wave rectifier circuit of FIG. 2. The emitter of PNP junction transistor 104 is connected to line 100. The base and collector of PNP junction transistor 104 are connected together; this device forms an diode equivalent and the reason for its use will be explained more fully with respect to FIG. 4.

Switching device 106, depicted as an N-chanel field effect transistor, is connected between input lines 100 and 102 as shown. Switching device 106 takes the place of diode equivalent 22 of FIG. 1, and turns on during the AC half-cycle when line 102 is positive with respect to line 100. The gate of switching device 106 is driven by the output of comparator 108 which is driven by input lines 100 and 102. Comparator 108 turns on the gate of switching device 106 whenever input line 102 is positive with respect to input line 100.

The substrate connection of switching device 106 is shown unconnected in FIG. 2. In actual implementation of the invention it is necessary to connect that substrate to the most negative of input lines 100 or 102. This connection, as well as other circuit details of the preferred embodiment, will be discussed more fully with respect to FIG. 3.

Figure 3:
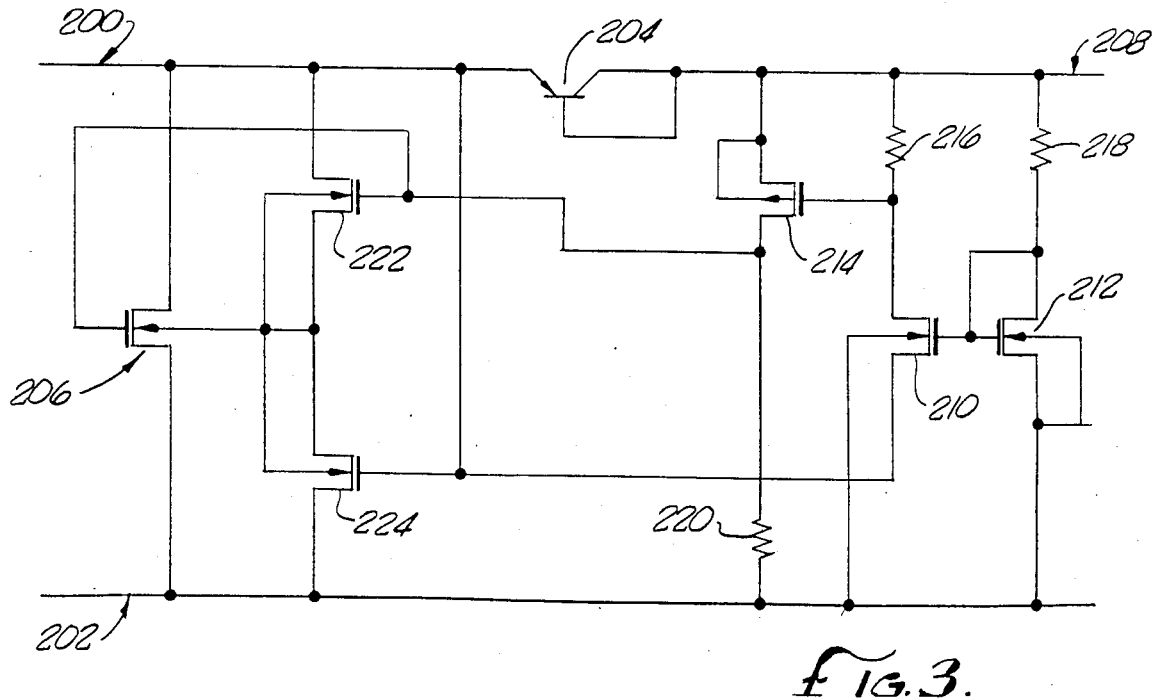
FIG. 3 is a detailed schematic diagram of a preferred embodiment of the present, invention.

FIG. 3 is a detailed schematic diagram of a preferred embodiment of the present invention and generally follows FIG. 2 in function; i.e., it is a more detailed description of the equivalent rectifier diode 20 and diode equivalent 22 of FIG. 1.

Referring now to FIG. 3, input line 200 is connected to the emitter of PNP junction transistor. The collector and base of PNP junction transistor 204 are connected to line 208, forming the positive output connection of the half-wave rectifier circuit of the present invention.

Switching device 206 is an N-Channel field effect transistor. Its gate is driven by the output of a comparator circuit comprising N-Channel field effect transistors 210 and 212, P-Channel enhancement field effect transistor 214, and resistors 216, 218 and 220. N-Channel field effect transistors 210 and 212 and resistors 216 and 218 are matched pairs.

The voltages at input lines 200 and 202 are compared at the source of N-Channel field effect transistor 210. If line 200 is positive with respect to lines 202, N-Channel field effect transistor 210 will be off since its source, connected to line 200 will be more positive than its gate, connected to line 208 through resistor 218. Likewise, P-Channel field effect transistor 214 will be off, since its gate to source voltage, established by current through resistor 216, will be zero.

N-Channel field effect transistor 212 is in series with its drain resistor, resistor 218 across the DC output terminals 208 and 202. The gate source turn on voltage for device 212 is approximately 0.5 volts. Once it starts conducting, current through resistor 218 will set its drain source voltage to about 0.7 volts, which will also establish its gate source voltage since the gate of N-Channel field effect transistor 212 is connected to its drain.

The gate of N-Channel field effect transistor 210 is connected directly to this constant voltage source. As line 202, to which the drain of N-Channel device 210 is connected, varies in voltage, N-Channel device 210 will turn on and off. When the gate source voltage of device 210 is 0.7 volts or more, i.e., line 200 is at the same potential or less positive than line 202, N-Channel device 210 will be on. When the voltage on line 202 rises above about 0.2 volts with respect to line 202, N-Channel device 210 will be completely turned off. Resistor 216 will therefore have no voltage drop across it, and P-Channel device 214 will be turned off.

If P-Channel field effect transistor 214 is off and no current flows through resistor 220, that resistor will have no voltage drop across it. This assures that N-Channel field effect transistor 206 is turned off, since its gate is connected to the node at which resistor 220 and N-Channel field effect transistor are connected and its source-gate voltage will thus be zero.

If line 200 is equal to or negative with respect to line 202, N-Channel field effect transistor 210 will turn on and the current flowing through it and resistor 216 will produce a gate-source voltage for P-Channel enhancement field effect transistor 214 which will turn on that device. This will cause the voltage across resistor 220 to positively bias the source-gate of N-Channel field effect transistor 206 and thus turn it on.

Devices such as N-Channel field effect transistor 206 should always have their substrates connected to the most negative voltage in a circuit. Since, in the present invention, the source and drain of N-Channel field effect transistor 206 are connected to lines 200 and 202 which change polarity once during each AC power cycle, N-Channel field effect transistors 222 and 224 serve to connect the substrate of N-Channel field effect transistor 206 to whichever of lines 200 or 202 is the most negative at any given time.

With further reference to FIG. 3, N-Channel field effect transistor 206 has its substrate connected to the common connection of the source of N-Channel field effect transistor 222 and drain of N-Channel field effect transistor 224 as well as both of their substrates. The drain of N-Channel field effect transistor 222 is connected to line 200 and the source of N-Channel field effect transistor 224 is connected to line 224.

When line 200 is positive with respect to line 202, N-Channel field effect transistor 222 is off. Since the gate of N-Channel field effect transistor 224 is more positive than its source, it is on and the substrates of devices 206, 222 and 224 are connected to line 202, the most negative voltage in the circuit.

If line 202 is more positive than line 200, P-Channel enhancement device 214 is turned on as previously described, causing current flow in resistor 220. In addition to N-Channel field effect transistor 210 being turned on, N-Channel field effect transistor 222 is turned on. N-Channel field effect transistor 224 will be turned off since line 200 is negative with respect to line 202. Therefore the substrates of devices 206, 222 and 224 are connected to line 200, the most negative voltage in the circuit.

The circuit of FIG. 3, as previously mentioned, functions in the environment of FIG. 1. In such an environment, assuming the AC voltage input to be at 120 volts, and further assuming the current required to the circuit being driven at 50 mA, capacitor 16 should have a value of approximately 1.5 microfarads, capacitor 24 should have a value of approximately 200 microfarads, and resistor 18 should have a value of approximately 15 ohms. Those of ordinary skill in the art will readily recognize how to scale the values of these components where other input and output voltages and current requirements are present.

Referring again to FIG. 3, resistors 216 and 218 should have a value of approximately 100K ohms and resistor 220 should have a value of approximately 200K ohms assuming 50/60 Hz AC input frequency, output current of approximately 50 mA at approximately 5 volts.

Referring now to FIGS. 4A and 4B, a semiconductor profile diagram of a preferred embodiment of the present invention is now depicted and its structure and a process for fabricating it will be discussed.

In a presently-preferred CMOS embodiment, the entire circuit structure is fabricated on a lightly doped N-type semiconductor material 300 as is well known in the art. P wells 302 and 304 are fabricated using known techniques to hold N-Channel devices 206, 222, 224 and N-Channel devices 210 and 212 respectively. P+ region 306 forms the emitter of PNP transistor 204; P+ regions 308 forms its collector and region 310 forms its base. It is noted that collector regions 308 form a guard ring and completely surround emitter region 306 in order to collect all minority carriers which are injected into the semiconductor substrate by forward biasing of the PN junction formed by regions 306 and 300.

Within P well 302 N+ region 312 forms the source of N-Channel device 222. N+ region 314 forms the drain of N-Channel device 222 and the drain of device 206. N+ region 316 forms the source region of N-Channel device 206 and the source region of N-Channel device 224. N+ region 318 forms the drain of N-Channel device 224. P+ region 320 forms the contact for the common substrate connections to devices 206, 222 and 224.

Likewise, P+ region 344, inside P well 304, forms the contact for the common substrate connections of N-Channel devices 210 and 212. P+ region 322, as well as P+ region 320, prevent extraneous interaction between adjacent components by preventing the formation of parasitic devices and are to that extent optional depending on the technology and processes employed, as is understood by those skilled in the art.

P+ region 324 forms resistor 218. P+ region 326 forms resistor 216. P+ region 328 forms resistor 220. P+ region 320 forms the source of P-Channel device 214. P+ region 332 forms the drain of N-Channel device 214. N+ region 334 forms the drain of N-Channel device 210. N+ region 336 forms the source of N-Channel device 210. N+ region 338 forms the drain of N-Channel device 212. N+ region 340 forms the source of N-Channel device 212.

It should be noted that the voltage on N+ region 310 will always be more positive than the P regions 302, 304, 324, 326, 328, 330 and 332 thus insuring that all PN junctions created between the substrate and these P regions are at all times reverse biased.

As is well understood by those of ordinary skill in the art, conventional masking and doping steps are used to form these P+ and N+ regions, all regions of like doping produced by the same step.

After all active substrate regions have been doped, a gate oxide layer 346 is grown over the entire semiconductor substrate surface. Following formation of the gate oxide layer the gates of the devices are formed by conventional masking deposition and etching steps. Region 350 forms the gate of N-Channel device 222. Region 352 forms the gate of N-Channel device 206. Region 354 forms the gate of N-Channel device 224. Region 356 forms the gate of P-Channel device 214. Region 358 forms the gate of N-Channel device 210. Region 360 forms the gate of N-Channel device 212. These gates may all be deposited in the same layer of either metal or semiconductor material as is well understood. Contact apertures are etched in gate oxide layer 346 and contact plugs 362 are then fabricated to form contact points to the various active regions in the substrate. A protective coating is deposited over the exposed surface (not shown) and connections between the various elements (shown schematically in FIGS. 4a and 4b) are made in one or more metallization layers using conventional deposition, masking and etching steps.

While a disclosure of typical steps in a CMOS process has been included herein for completeness, such steps are conventional and are well understood by those of ordinary skill in the art. Additionally, although the preferred embodiment has been disclosed with respect to silicon substrates, those of ordinary skill in the art will readily appreciate and comprehend how other materials may be used. While the present invention has been disclosed as a preferred P-well CMOS embodiment, those of ordinary skill in the art will readily appreciate that other combinations and technologies such as N-well CMOS and others may be employed without departing from the spirit of the invention as expressed in the appended claims, which are intended to cover all such obvious modifications.

What is claimed is:

1. An off-line, current-driven, half-wave AC to DC power converter circuit, including:
    series-pass diode equivalent means for passing current in the direction from a first AC input terminal to a first DC output terminal;
    a second AC input terminal common to a second DC output terminal;
    comparing means for sensing when the voltage on said second AC input terminal is positive with respect to said first AC input terminal;
    switching means responsive to said comparing means for passing current from said second AC input terminal to said first AC input terminal when said comparing means senses that the voltage on said AC second input terminal is positive with respect to said first AC input terminal,
    said circuit integrated as a monolithic integrated circuit.

2. The off-line, current-drive, AC to DC power converter circuit of claim 1 wherein said series pass diode equivalent means is a lateral PNP transistor.

3. The off-line, current-driven, AC to DC power converter circuit of claim 1 wherein said switching means is an N-channel MOS transistor.

4. The off-line, current-driven, AC to DC power converter circuit of claim 3 further including switching means, responsive to the voltage between said first and second input terminals for selectively connecting the substrate of said N-channel MOS transistor to the one of said first and second input terminals which is the most negative.

5. The off-line, current driven, AC to DC power converter circuit of claim 1 wherein:
    said series pass diode equivalent means in a lateral PNP transistor, said switching means in an N-channel MOS transistor, and
    further including switching means responsive to the voltage between said first and second input terminals for selectively connecting the substrate of said N-channel MOS transistor to the one of said first and second input terminals which is the most negative.

6. An off-line, current-driven, AC to DC power converter circuit, including:
    a lateral PNP transistor having its emitter connected to a first AC input terminal, and its base and collector connected together to a first DC output terminal,
    a second AC input terminal common to a second DC output terminal, an N-channel MOS transistor having its source connected to said first AC input terminal, its drain connected to said second AC input terminal, and its gate terminal connected to the output of a comparator,
    said comparator including a first N channel MOS transistor having its source connected to said second AC input terminal, its drain and gate connected to said first DC output terminal through a first resistor, a second N channel MOS transistor, equally matched to said first N channel MOS transistor, said second N-channel MOS transistor having its source connected to said first AC input terminal, its drain connected to said first DC output terminal through a second resistor having a resistance substantially that of equal to said first resistor, and its gate connected to the gate of said first N channel MOS transistor, and a first P-channel MOS transistor having its source connected to said first DC output terminal, its drain connected to said second AC input terminal through a third resistor, the output of said comparator being its drain terminal.

* * * * *